UNITED STATES PATENT OFFICE.

AXEL HELMER HAEFFNER, OF SKUTSKÄR, SWEDEN.

METHOD OF SIZING PAPER, CARDBOARD, AND THE LIKE.

1,231,153.     Specification of Letters Patent.     Patented June 26, 1917.

No Drawing.     Application filed January 15, 1917. Serial No. 142,524.

*To all whom it may concern:*

Be it known that I, AXEL HELMER HAEFFNER, a citizen of the Kingdom of Sweden, residing at Skutskär, Sweden, have invented a new and useful Improvement in the Method of Sizing Paper, Cardboard, and the like, of which the following is a specification.

It has already been proposed to use sulfite waste liquor for sizing paper and the like, if preferred, with addition of other substances, as for instance resin. No practical results have, however, as far as is known, been attained by said proceeding, and owing thereto, it has not come into practical use.

The present inventor has ascertained that a far better result is obtained, if instead of using the common waste liquor derived from the sulfite boilers, the liquor first is neutralized and the saccharine matters contained therein then are fermented, whereafter, if desired, the alcohol formed is distilled off. From waste liquor treated in this manner a product well adapted for sizing paper and the like may be precipitated by alum, sulfate of alumina and similar substances. The sulfite waste liquor obtained in this manner may be used alone or in addition to resin-size.

For the purpose in question the liquor may be used in the state in which it is obtained from the distilling apparatus intended for recovery of alcohol from the fermented liquor, it is to say containing about 10% of dry substance, or after evaporating part of its percentage of water.

The fermented liquor is introduced into the rag-engine in the same manner as is the case with resin-size. 20 liters of waste liquor of 10% dry substance being equivalent to 1 kilogram of resin-size. The alum is added approximately in the same proportion as in sizing by means of common resin-size.

A mixture which has been found to be adapted for common wrapping-paper is composed as follows, the composition being calculated for 100 kilograms of paper:

25 kilograms of waste liquor (of 10% dry substance.)
    0.5 kilogram of resin-soap.
    1 kilogram of alum.

Should the sulfite liquor after the fermentation or the distillation of the alcohol present too high acidity, the liquor may, before use, be neutralized, by addition of lime or other basic substances in any well-known manner.

Having now described my invention, what I claim as new and desire to secure by Letters Patent is:

1. Method of sizing paper, cardboard and the like, consisting in incorporating sizing matters precipitated from fermented sulfite liquor into the pulp, substantially as and for the purpose described.

2. Method of sizing paper, cardboard and the like, consisting in precipitating sizing matters contained in fermented sulfite liquor, and incorporating said matters into the pulp, substantially as and for the purpose described.

3. Method of sizing paper, cardboard and the like, consisting in adding fermented sulfite liquor to the pulp, and precipitating sizing matters contained in said liquor, substantially as and for the purpose described.

4. Method of sizing paper, cardboard and the like, consisting in precipitating sizing matters contained in fermented sulfite liquor by means of alum, aluminium sulfate or the like, and incorporating the precipitated matters into the pulp, substantially as and for the purpose described.

5. Method of sizing paper, cardboard and the like, consisting in adding to the pulp fermented sulfite liquor and a substance capable of precipitating sizing matters contained in said sulfite liquor, substantially as and for the purpose described.

6. Method of sizing paper, cardboard and the like, consisting in precipitating sizing matters contained in fermented sulfite liquor, and incorporating said matters into the pulp together with usual resin size, substantially as and for the purpose described.

7. Method of sizing paper, cardboard and the like consisting in adding to the pulp fermented sulfite liquor, resin soap and a substance capable of precipitating sizing matters from said liquor and soap, and incorporating the precipitated matters into the pulp, substantially as and for the purpose described.

In testimony whereof I have signed my name.

AXEL HELMER HAEFFNER.